(12) United States Patent
Fujisaki et al.

(10) Patent No.: US 7,206,995 B2
(45) Date of Patent: Apr. 17, 2007

(54) TIME INFORMATION DISPLAY SYSTEM

(75) Inventors: Kozo Fujisaki, Chigasaki (JP);
Hiroyoshi Tsuchiya, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 659 days.

(21) Appl. No.: 10/213,536

(22) Filed: Aug. 6, 2002

(65) Prior Publication Data
US 2003/0051211 A1 Mar. 13, 2003

(30) Foreign Application Priority Data
Aug. 6, 2001 (JP) .............................. 2001-237252

(51) Int. Cl.
*G06N 3/00* (2006.01)
(52) U.S. Cl. .................................... 715/500
(58) Field of Classification Search ................ 715/513, 715/517, 530, 500, 523
See application file for complete search history.

(56) References Cited

U.S. PATENT DOCUMENTS

| 4,106,060 A | * | 8/1978 | Chapman, Jr. | ............. 358/402 |
| 4,313,186 A | * | 1/1982 | Yoshida | ........................ 368/22 |
| 2001/0003826 A1 | | 6/2001 | Shinichiro | |

FOREIGN PATENT DOCUMENTS

| CN | 1303202 A | 7/2001 |
| EP | 0908869 A2 | 4/1999 |
| JP | 06-203031 | 7/1994 |
| JP | 06-203031 A | 7/1994 |
| JP | 06-266723 | 9/1994 |
| JP | 06-266723 A | 9/1994 |
| JP | 11-096146 | 4/1999 |

OTHER PUBLICATIONS

"The History of the Internet," <http://inventors.about.com/inventors/blinternet.htm>, pp. 1-4.*

* cited by examiner

*Primary Examiner*—Stephen Hong
*Assistant Examiner*—Kyle Stork
(74) *Attorney, Agent, or Firm*—Townsend and Townsend and Crew LLP

(57) ABSTRACT

A time information display system includes: a storage unit for storing document data; a date/time character string detecting unit for detecting whether or not a character string is contained with a character string of the document data; a relative date/time detecting unit operated in detecting a date/time expression by the date/time character string detecting unit, the relative date/time detecting unit detects whether or not a date/time character string is equal to a relative date/time expression; an absolute date/time converting unit for converting the relative date/time expression into an absolute date/time expression; a unit for storing the absolute date/time character string; a unit for calculating difference date/time between present date/time and the absolute date/time; a relative date/time converting unit for converting the calculated difference date/time into relative date/time with respect to the present date/time; and a storage unit for storing the relative date/time character string.

11 Claims, 5 Drawing Sheets

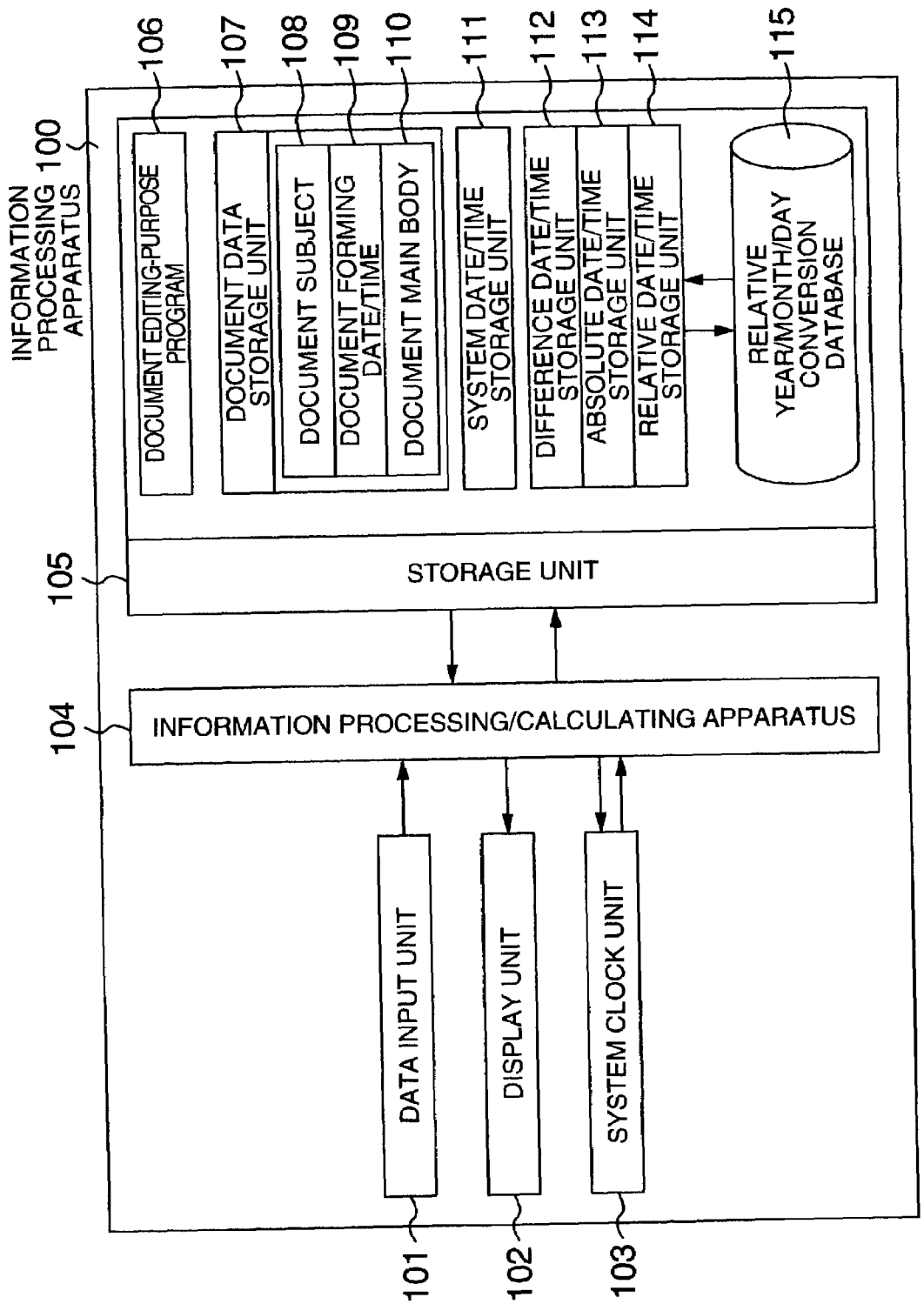

FIG. 2A

RELATIVE YEAR CONVERSION TABLE

| DIFFERENCE YEAR | RELATIVE YEAR EXPRESSION 1 | RELATIVE YEAR EXPRESSION 2 | ----- | |
|---|---|---|---|---|
| -2 | THE YEAR BEFORE LAST | TWO YEARS AGO | | |
| -1 | LAST YEAR | ONE SUCCEEDING YEAR | | |
| 0 | THIS YEAR | PRESENT YEAR | | |
| 1 | NEXT YEAR | | | |
| 2 | THE YEAR AFTER NEXT | TWO YEARS LATER | | |
| | ⋮ | ⋮ | | |

FIG. 2B

RELATIVE MONTH CONVERSION TABLE

| DIFFERENCE MONTH | RELATIVE MONTH EXPRESSION 1 | RELATIVE MONTH EXPRESSION 2 | | |
|---|---|---|---|---|
| -2 | THE MONTH BEFORE LAST | TWO MONTHS AGO | | |
| -1 | LAST MONTH | ONE SUCCEEDING MONTH | | |
| 0 | THIS MONTH | PRESENT MONTH | | |
| 1 | NEXT MONTH | ONE MONTH LATER | | |
| 2 | THE MONTH AFTER NEXT | TWO MONTHS LATER | | |
| | ⋮ | ⋮ | | |

FIG. 2C

RELATIVE DAY CONVERSION TABLE

| DIFFERENCE DAY | RELATIVE DAY EXPRESSION 1 | RELATIVE DAY EXPRESSION 2 | | |
|---|---|---|---|---|
| -2 | THE DAY BEFORE LAST | TWO DAYS AGO | | |
| -1 | YESTERDAY | ONE SUCCEEDING DAY | | |
| 0 | TODAY | THIS DAY | | |
| 1 | TOMORROW | ONE DAY LATER | | |
| 2 | THE DAY AFTER NEXT | TWO DAYS LATER | | |
| | ⋮ | ⋮ | | |

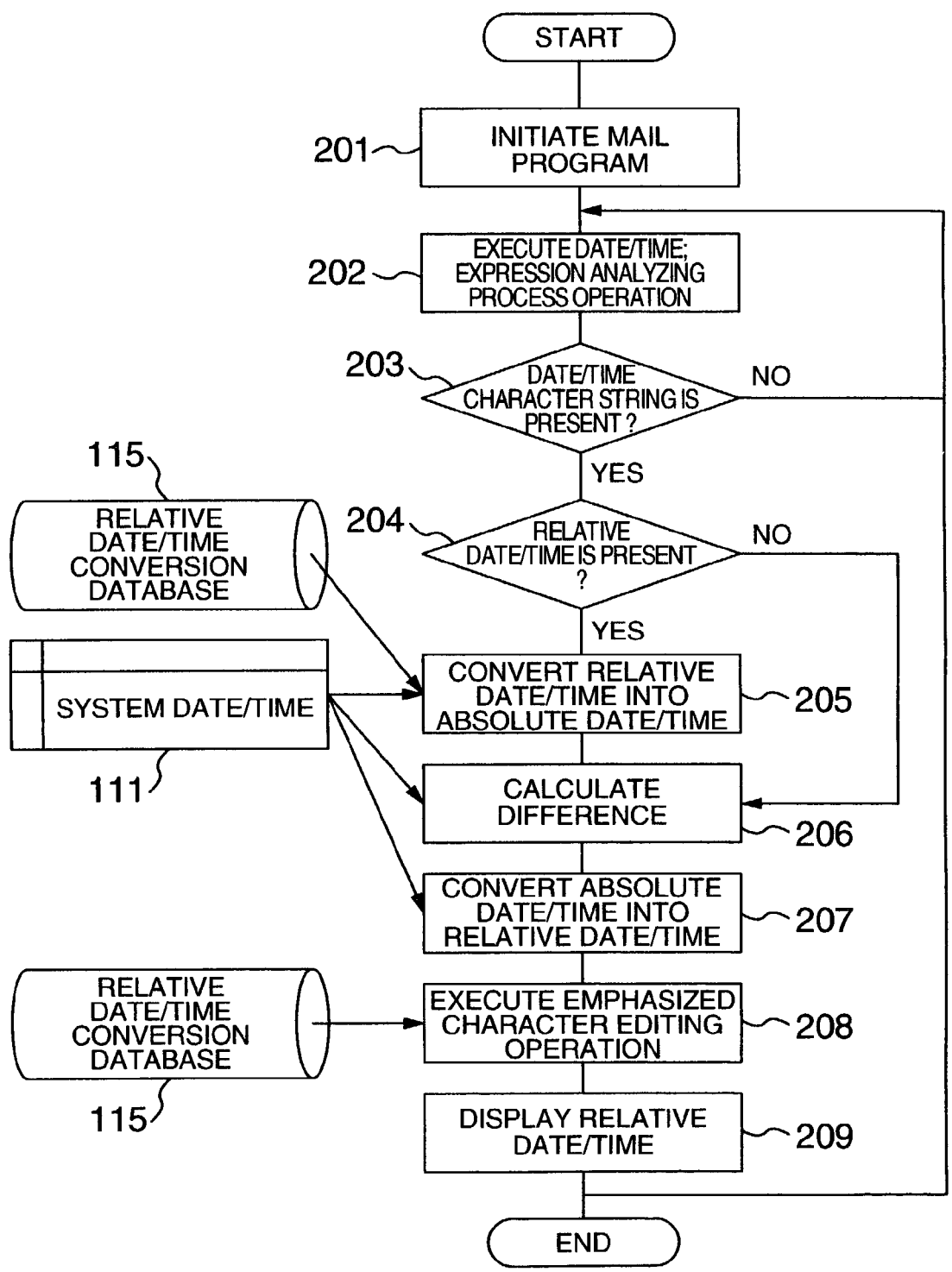

FIG. 4

AGENDA RECORDS ON MONTHLY MEETING : MARCH (THIS MONTH), 2001

MARCH 15 (TODAY), 2002

CONTENTS OF MEETING : METHOD FOR EXECUTING WORK IN FUTURE
MEETING HELD DAY : *MARCH 10 (5 DAYS BEFORE), 2001*
DICIDED ITEMS :

(1) PROJECT WHICH IS SCHEDULED TO BE COMMENCED IN 2003 (THE YEAR AFTER NEXT) WILL BE SEPARATELY CONSIDERED.

(2) SYSTEM CHANGING WORK WHICH IS SCHEDULED ON *MARCH 17, SATURDAY* (THE DAY AFTER NEXT) SHOULD BE REPORTED *NEXT WEEK*.

(3) MONTHLY MEETING SCHEDULE OF *APRIL* (NEXT MONTH) WILL BE SEPARATELY RESCHEDULED.

| STATUS | SUBJECT | MAIL SENDING PERSON | TRANSMISSION DATE |
|---|---|---|---|
| NOT YET SENT | CONGRATULATION LETTER OF STARTING-UP BUSINESS WILL BE SENT *TODAY* | KOZO FUZISAKI | 3/13 |
| NOT YET SENT | AS TO MEETING WHICH IS SCHEDULED TO BE HELD ON *MARCH 11 (THE DAY BEFORE NEXT)* | YASUHIKO OKABE | 3/4 |
| NOT YET SENT | *MARCH 15 (TOMORROW)* IS THE DAY WHEN EVERY ONE SHOULD LEAVE OFFICE ON THE REGULAR TIME | TAKASHI MORIMOTO | 3/4 |
| NOT YET SENT | DEVELOPMENT SCHEDULE OF *MAY (THE MONTH AFTER NEXT)* IS PROPOSED | JUNPEI SUZUKI | 3/1 |

DATE OF TODAY: MARCH 13

TIME INFORMATION DISPLAY SYSTEM

BACKGROUND OF THE INVENTION

The present invention relates to a time information display system capable of appending relative date and time with respect to a date and time expression character string on the basis of present date and time to display the time information.

Generally, forming of documents on computers is very recently popularized. Also, exchanging of documents by using electronic mails is popularized. There are many cases that broadcasting notifications such as notifications as to holding of meetings are issued by way of electronic mails. In this case, such an expression "meeting will be held tomorrow" may be used in subjects and the like of mail documents. However, a mail receiving person does not always read a mail document on the date and time when a mail sending person sends this electronic mail. Thus, the mail receiving person can hardly judge the relevant date and time by merely viewing the subject. As a consequence, the mail receiving person may judge this relevant date/time by confirming the date/time when the mail document was actually sent. On the other hand, in order to clearly define the relevant date/time, the mail sending person requires to clearly write the relevant date/time in the subject. These actions may cause certain probabilities that both the mail sending person and the mail receiving person may mistakenly recognize incorrect date and time.

To solve these problems, JP-A-11-96146 has proposed such a technique that while the time difference is calculated based upon both the inputted time information and the previously-registered schedule data, such an expression "several days are still left" is displayed.

Also, JP-A-6-203031 has proposed the following technique. That is, such relative date/time expressions as "Wednesday in last week" and "today" are converted into the absolute date/time expressions corresponding thereto, and the converted absolute date/time expressions are displayed.

Furthermore, JP-A-6-266723 describes the document forming apparatus which converts the relative time into the absolute time, and also, converts the absolute time into the relative time based upon the document forming time.

However, in the above-described technique disclosed in JP-A-11-96146, since the time difference with respect to the schedule data which has been previously registered by the user is calculated, there are many opportunities that when the first electronic mail as to the notification of holding of the meeting is received, this meeting has not yet been registered in the above schedule date. As a result, after the user has registered the schedule data, the user is newly required to confirm the content of the electronic mail. Also, since the time is calculated with respect to the previously registered schedule data, there is a certain possibility that another time difference is calculated with respect to such a schedule data different from this meeting to display this calculated time difference.

Also, in the above-described technique disclosed in JP-A-6-203031, when the document is inputted, the relative date/time is converted into the relevant absolute date/time. Therefore, in such a case that an electronic mail in which a relative date/time expression is used in a subject, or the like is transmitted, the mail receiver requires to confirm an absolute date/time corresponding thereto based upon a calendar. Also, in the case that a mail input person does not immediately transmit an electronic mail, if the mail input person forms a document by considering transmission date/time, then there is such a problem that this transmission date/time is converted to such an absolute date/time which is different from the actual absolute date/time.

Also, in the above-explained technique described in the JP-A-6-266723, while the document forming time is used as the reference time, the absolute time may be converted into the relative time so as to display the converted relative time. However, in the case that the unsealing time of the mail reading person is different from the document forming time of the mail sender, there is a problem that no specific care is taken as to the display of the time expression described in the document.

SUMMARY OF THE INVENTION

An object of the present invention is to avoid an erroneous recognition of the date and time, which is caused by recognition shifts occurred between a document forming person and a document reading person, and furthermore, is to reduce a work load when a document is formed by this document forming person by executing a process operation in such a manner that all of date/time expressions which have been previously entered are automatically converted into relative date/time based upon present date/time, and then, the automatically converted relative date/time is appended to original expressions thereof so as to display both the original expressions and the relative date/time appended thereto.

To solve the above-described problems, a time information display system, according to the present invention, is featured by comprising: a storage unit for storing thereinto all of character strings of document data such as a subject of document data and forming date/time of the document data; a date/time character string detecting unit for detecting as to whether or not a character string indicative of date/time is contained with respect to a character string of the document data stored in the storage unit; a relative date/time detecting unit operated in such a manner that when a date/time expression is detected by the date/time character string detecting unit, the relative date/time detecting unit detects as to whether or not a date/time character string of the document data stored in the storage unit is equal to a relative date/time expression; an absolute date/time converting unit for converting the relative date/time expression detected by the relative date/time detecting unit into an absolute date/time expression; a storage unit for storing thereinto the absolute date/time character string converted by the absolute date/time converting unit; a difference date/time calculating unit for calculating difference date/time between present date/time and the absolute date/time expression stored in the storage unit; a relative date/time converting unit for converting the calculated difference date/time calculated by the difference date/time calculating unit into relative date/time with respect to the present date/time; and a relative date/time expression storage unit for storing thereinto the relative date/time character string converted by the relative date/time converting unit.

In the case that a date/time expression is judged, while character strings of expressions which may be predicted as the date/time expressions are previously registered, a judgment is made as to whether this date/time expression is made coincident with a relative date/time expression, or an absolute date/time expression. For instance, while expressions such as "tomorrow" and "next week" are previously stored as the fixed character strings of the relative date/time expressions and also expressions such as "numeral+day" are previously stored as the fixed character strings of the absolute date/time expressions, if a range of character strings is registered which are cut out in correspondence to these relative date/time expressions and absolute date/time expressions, then only a date/time expression can be cut out. This cut-out character string and a position where this character string is cut out from an original document are stored into the storage unit in correspondence with each other, and then, a converting process operation is carried out. It should be noted that the judgment as to whether the character string is made coincident with the relative date/time expression, or the absolute date/time expression may be newly confirmed after this character string has been cut out. Alternatively, when the character string is cut out, the sort of such fixed character string coincident with this cut-out character string is registered in correspondence with this cut-out character string. Then, the above-described judgment may be carried out in accordance with these registered data. All of the registered relative date/time character strings are converted into absolute date/time. This conversion operation from the relative date/time into the absolute date/time is carried out in such a manner that while the document forming date/time is employed as the reference date/time, this relative date/time is converted into the absolute date/time based upon a correspondence table between the relative character string and the difference value with respect to the reference date/time. The absolute date/time character string is merely left. As a result, such a correspondence table between the absolute date/time character strings and the original positions thereof within the document may be formed. Next, the absolute date/time character string is converted into the relative character string, while the present date/time is used as the reference date/time. This conversion from the absolute date/time character into the relative date/time character may be carried out by using the above-explained difference value correspondence table in a reverse manner. As to the present date/time used as the reference date/time, for example, in the case of a document file, such a date/time when this document file is firstly opened is used as this present date/time. In the case of an electronic mail, a delivering time thereof is employed as this present date/time. The reference date/time is displayed to a file/mail receiving person without giving any misunderstanding.

The relative date/time expression after being converted is displayed at a predetermined with respect to the absolute date/time expression character string before being converted, which is contained in the corresponding document data based upon the correspondence table between this predetermined position and the position of the original document. Concretely such a clear display is made. That is, the relative date/time expression character string after being converted is inserted subsequent to the absolute date/time expression character string before being converted, while this relative date/time expression after being converted is parenthesized, or bracketed. Alternatively, this relative date/time expression character string after being converted may be inserted into a space made between an upper line and a lower line as to the absolute date/time expression character string before being converted. As a result, a relationship between the character string before being converted and the character string after being converted can be grasped at a first glance. In addition, as to the character string before being converted, an emphasized character editing operation is carried out by providing an emphasized character editing unit by way of a font format converting operation such as boldface, italics, underlined formats, and color changed formats. In the case of a simple text document, a character string after being converted is appended to a character string before being converted by being inserted into character string data. In such a case of a document having an HTML document structure, such a means may be employed in such a manner that a text figure is inserted into a predetermined position. Also, in the case that an original document is formed by using document forming software of the latest version, since data of absolute date/time is directly contained in a date expression, this value may be directly employed in a date/time expression converting operation.

The time information display system for displaying relative date and time, according to the present invention, may be similarly applied also to such an electronic mail document having a structure in which this document is subdivided into both a subject and a main body. In the case of an electronic mail, a relative date/time expression may be inserted into a subject of this electronic mail in order that the relative date/time may be discriminated from a subject list without opening a main body of this electronic mail. Alternatively, a color of the subject of this electronic mail may be changed in response to temporal propagations with respect to the present date/time. While a date/time expression item is provided in an electronic mail system, expressions "today", "tomorrow", "the day after tomorrow", and the like may be indicated by way of a character and a symbol.

Other objects, features and advantages of the invention will become apparent from the following description of the embodiments of the invention taken in conjunction with the accompanying drawings.

BRIEF DESCRIPTION OF THE DRAWINGS

FIG. 1 is a schematic block diagram for representing a time information display system according to an embodiment of the present invention.

FIG. 2A, FIG. 2B, and FIG. 2C are diagrams for showing contents of storage data in a relative year/month/day conversion database employed in the time information display system according to the present invention.

FIG. 3 is a flow chart for describing a relative date and time expression processing operation executed in the time information display system according to the present invention.

FIG. 4 is a diagram for illustratively showing such an example in which a date and time expression analyzing process operation is executed with respect to main body data of a document by the time information display system of the present invention so as to display a relative day and time expression character string.

FIG. 5 is a diagram for illustratively representing such an example in which in the case that the time information display system of the present invention is applied to an electronic mail program, the date and time expression analyzing process operation is executed with respect to either a subject or a main body of a received electronic mail so as to display a relative day and time expression character string.

DETAILED DESCRIPTION OF THE EMBODIMENTS

Referring now to drawings, the present invention will be described in detail.

FIG. 1 is a structural block diagram for indicating a structural arrangement of a time information display system according to the present invention. An information processing apparatus 100 is arranged by that a storage unit 105, a data input unit 101, a display unit 102, and a system clock unit 103 are connected to an information processing/calculating apparatus 104. This storage unit 105 stores thereinto a program used in the information processing apparatus 100. The information processing apparatus 100 may be realized by a general-purpose PC (personal computer) and a mail terminal. Both a document editing-purpose program 106 for a document date changing/editing operation, and data used to execute these functions have been previously stored into the storage unit 105 in connection to the above-described program for the information processing apparatus 100. This storage unit 105 is equipped with a document data storage unit 107, a system date/time storage unit 111, a difference date/time storage unit 112, an absolute date/time storage unit 113, a relative date/time storage unit 114, and a relative year/month/day conversion database 115.

Information as to document data which is extracted by the above-described document editing-purpose program 106 is stored into the document data storage unit 107. Concretely, document subject data, document forming date/time data, and document main body data are stored into the document data storage unit 107.

Present date and time are stored into the system date/time storage unit 111 when a program is initiated, or when an electric mail is received, while the present date/time are sequentially updated by the central processing/calculating apparatus 104 based upon a clock signal supplied from the document editing program 106.

In the absolute date/time storage unit 113, the following analysis result is entered. That is, since the document editing program 106 is executed, data stored in the document data storage unit 107 is analyzed, and a date/time expression analyzing process operation is carried out with respect to the document data, so that the analysis result is obtained. In the date/time expression analyzing process operation, a judgement is made as to whether or not an expression indicative of relative date/time, and another expression representative of absolute date/time are contained with respect to the document data. It should be noted that these expressions are previously stored into the storage unit 105 as a list of previously-fixed expressions.

This list is constituted by an expression character string such as "tomorrow", "next week", and "numeral+day"; a sort of expression as to whether an expression character string corresponds to a relative date/time expression or an absolute date/time expression; and a correspondence relationship. That is, in this correspondence relationship, this expression character string is cut out by determining that how many characters are cut out before/after the relevant character string, or this expression character string is cut out based upon which condition. In the case that a date/time expression is contained, the central processing/calculating apparatus 104 judges as to whether or not such a character string corresponding to this date/time expression in the list is equal to the absolute date/time expression, or the relative date/time expression based upon the sort thereof.

When the relevant character string is equal to the absolute date/time expression, a character string is cut out as absolute date/time data based upon a cut-out logic of the corresponding character string in the list, and then, this cut-out character string is stored into the absolute date/time storage unit 113 in correspondence to positional data within the document. When the relevant character string is equal to the relative date/time expression, while the above-described document forming date/time data is used as reference date/time, an absolute date/time is calculated by adding/subtracting a difference value at the forming date/time of the document based upon the relative year/month/day conversion database 115. This relative year/month/day conversion database 115 indicates a correspondence relationship between the relative character string which has been previously stored in the storage unit 105 and a difference value with respect to the reference date/time. The data which has been converted as the absolute date/time expression is stored into the absolute date/time storage unit 113 in correspondence with positional data within the document.

Next, the absolute display expression stored in the above-explained absolute date/time storage unit 113 is converted into a relative date/time expression based upon the above-described relative year/month/day conversion database 115 and the present date/time stored in the system date/time storage unit 111, and then, this converted relative date/time expression is stored into the relative date/time storage unit 114. At this time, the correspondence relationship with respect to the positional data within the document is directly succeeded to be stored into the relative date/time storage unit 114.

FIG. 2A, FIG. 2B, and FIG. 2C are diagrams for showing contents of the relative year/month/day conversion database 115 employed in the storage unit 105 of the above-described information processing apparatus 100. Precisely, a relative year conversion table is shown in FIG. 2A, a relative month conversion table is indicated in FIG. 2B, and a relative day conversion table is represented in FIG. 2C.

In this relative year/month/day conversion database 115, relative date/time expression character strings corresponding to the difference date/time are stored, and are utilized when such a process operation for converting a relative date/time expression contained in the above-described document data into an absolute date/time expression is carried out, and also are utilized when such a process operation for converting an absolute date/time expression contained in the above-described document data into a relative date/time expression.

Subsequently, a description will now be made of a function of the document editing-purpose program 106 executed in the image processing apparatus 100 with employment of the above-described arrangement.

FIG. 3 is a flow chart for describing a relative date/time expression processing operation which is executed with respect to an electronic mail.

An input unit 101 is manipulated so as to designate an initiation function of the document editing-purpose program 106, so that the document editing-purpose program 106 stored in the storage unit 105 is read so as to be initiated (step 201).

When the document editing-purpose program 106 is initiated, document data is read, and then, a subject of a document is stored into a document subject storage unit 108; forming date/time of the document is stored into a document forming date/time storage unit 109; and also a main body of the document is stored into a document main body storage unit 110. Since the document editing-purpose program 106 is executed, the document data which are stored in both the document subject storage unit 108 and the document main body storage 110 are read out by either a predetermined character number or a preselected character string, and the date/time expression analyzing process operation is carried out with respect to the read data in order to judge as to whether or not such a character string indicative of date/time is contained in the read data based upon the fixed character string list (steps 202 and 203).

When it is so judged that the character string indicative of the date/time is not contained in the read document data, next document data is read, and then, the process operations defined in the above-described steps 202 and 203 are carried out with respect to this next document data.

To the contrary, when it is so judged that the character string indicative of the date/time is contained in the read document data, a check is made as to whether or not this character string corresponds to the relative date/time expression. While this character string is employed as a retrieve key, the relative date/time expression character strings of the relative year/month/day conversion data base 115 are retrieved. In the case that such a character string coincident with the above-described character string indicative of the date/time is present, it is so judged that this character string is equal to the relative date/time expression. To the contrary, when such a character string coincident with this character string indicative of the date/time is not present, it is so judged that this character string is not equal to the relative date/time expression (step 204).

When it is so judged that this character string is equal to the relative date/time expression, this relative date/time expression is converted into an absolute date/time expression in such a way that the document forming date/time data stored in the document forming date/time storage unit 109 is added to such a difference date/time which corresponds to the relative date/time expression character string of the relative year/month/day conversion database 115, which is made coincident with this character string (step 205). To the contrary, in the case that it is so judged that this character string is not equal to the relative date/time expression, this character string is processed based upon the cut-out logic of the fixed character string list so as to cut out a date/time portion thereof. Then, this cut-out date/time portion is stored as absolute date/time data into the absolute date/time storage unit 113 in correspondence with positional data of the character string.

A difference calculating process operation is carried out based upon the absolute date/time data stored in this absolute date/time storage unit 113 and the system date/time (step 206).

A relative date/time converting process operation is carried out by extracting such a relative date/time expression character string corresponding to a result of the above-described difference calculating process operation from the relative year/month/day conversion database 115 (step 207).

A relative day/time expression portion before being converted, which is contained in the subject of the document, is specified from the positional data corresponding to the relative date/time character string which has been converted by executing the above-described relative date/time converting process operation, and then, an emphasized character editing process operation such as a bold character and an italic character is carried out with respect to this character string (step 208).

The character string of the relative date/time expression after being converted is inserted into a position succeeding to the relative date/time expression character string before being converted, which has been edited by the above-described emphases character editing process operation. In this case, such a character string of the relative date/time expression after being converted may be displayed by inserting an expression capable of indicating a character string range such as symbols of ( ) and [ ] before/after this character string (step 209).

As previously explained, the relative date/time expression is appended on the basis of the present date/time with respect to the relative date/time expression and the absolute date/time expression while using the forming date/time contained in the subject of the document as the reference date/time.

It should be understood that the process operations defined in the respective steps shown in FIG. 3 may be executed by a program which has been stored into a computer-readable storage medium. This program is not always limited to be provided in the form of such a program stored in a storage medium, but may be provided in the form of such a program of a transfer medium which is provided via a network.

FIG. 4 illustratively shows an example in which, as previously explained, the date/time representation analysis is carried out with respect to the main body data of the document so as to display the relative date/time expression character string.

FIG. 5 indicates an example in which while the present invention is applied to a program directed to an electronic mail, when this electronic mail-purpose program is initiated, the above-described date/time expression analysis is carried out with respect to either a subject of a received electronic mail or a main body of this electronic mail, and relative date/time expression character strings are displayed in a subject list. In this example, since the relative date/time expression character string is inserted after the subject of the mail, a correspondence relationship between the relative date/time and the present date/time can be grasped at a first glance. Alternatively, as to an electronic mail, while a means for selecting such a process operation is provided and this process operation is executed by analyzing only a subject portion of a document and by converting an absolute date/time expression into a relative date/time expression of this analyzed subject portion, a time duration required for this analysis may be shortened.

In accordance with the present invention, the character string indicative of such a date/time which has already been entered is sensed, and then, the sensed such a character string indicative of the date/time is automatically converted into the relative date/time expression using the present date/time as the reference date/time, so that the correct relative relationship with respect to the present date/time can be obtained. Also, since the converted display is appended to the original sentence, recognitions of both the document forming person and the document reading person can be confirmed, and the erroneous recognitions made between both the document forming person and the document reading person can be reduced, so that the efficiency of the document forming operation can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A time information display system comprising:

receiving means for receiving document data by electronic mail;

storage means for storing the document data received by electronic mail;

date/time character string detecting means for reading the document data from said storage means and detecting whether a character string indicative of data/time is contained within the document data stored in said storage means;

relative data/time detecting means for operating in such a manner that when a date/time character string is detected by said date/time character string detecting means, said relative date/time detecting means detects whether the date/time character string stored in said storage means is equal to a relative date/time expression;

absolute date/time convening means for converting the relative date/time expression detected by said relative date/time detecting means into an absolute date/time expression;

means for storing the absolute date/time character string converted by said absolute date/time converting means;

means for calculating difference date/time between present date/time and the absolute date/time stored in said storage means;

relative date/time converting means for converting said calculated difference date/time into relative date/time with respect to the present date/time; and storage means for storing the relative date/time character string converted by said relative date/time converting means, wherein the converted character string of the relative date/time is arranged to be displayed together with the date/time character string contained in the previously read document data.

2. A time information display system as claimed in claim 1 wherein:

said time information displaying system is further comprised of:

character string editing means for editing a date/time expression character string before being converted, which is contained in the document data, corresponding to the stored relative data/time expression after being converted in such a manner that the edited date/time expression character string is displayed in a discriminatable manner with respect to another portion of the document data; and display means for adding the relative date/time expression which has been convened into the relative date/time at such a position that said added relative date/time expression corresponds to the date/time expression character string edited by said character string editing means.

3. A time information display system as claimed in claim 2 wherein:

said time information display system is further comprised of:

a display processing unit for executing a relative date/time expression conversion as to both a subject and a main body contained in an electronic mail document, while the present date/time is used as reference date/time, and for adding such an expression capable of discriminating the relative date/time to a subject list display portion of the electronic mail.

4. A time information display system as claimed in claim 1 wherein:

said time information display system is further comprised of:

a display processing unit for executing a relative date/time expression conversion as to both a subject and a main body contained in an electronic mail document, while the present date/time is used as reference date/time, and for adding such an expression capable of discriminating the relative date/time to a subject list display portion of the electronic mail.

5. A computer readable storage medium storing program code capable of adding relative date/time information to date/time information described in a document received by electronic mail, wherein:

said computer readable storage medium stores program code capable of causing a computer to realize;

a date/time character string detecting program for detecting whether a character string indicative of date/time is contained in a character string read out from stored document data, the document data received b electronic mail;

a relative date/time detecting program operated in such a manner that when a date/time expression is detected by said date/time character string detecting program, said relative date/time detecting program detects whether a relative date/time expression is present with respect to the date/time expression character string;

a program for converting the relative date/time expression detected by said relative date/time detecting program into an absolute date/time expression;

a program for storing the converted absolute date/time character string;

a program for calculating difference date/time between present date/time and the stored absolute date/time;

a relative date/time converting program for converting said calculated difference date/time into relative date/time with respect to the present date/time;

a program for storing the relative date/time character string converted by said relative date/time converting program; and a program for displaying the converted character string of the relative date/time together with the character string of date/time contained in the previously read document data.

6. A computer-readable medium having stored thereon program codes for adding relative date/time information to date/time information described in a document received by electronic mail, the program codes capable of causing a computer to realize;

a date/time character string detecting program for detecting whether a character string indicative of date/time is contained in a character string read out from stored document data, the document data received by electronic mail;

a relative date/time detecting program operable in such a manner that when a date/time expression is detected by said date/time character string detecting program, said relative date/time detecting program detects whether a relative date/time expression is present with respect to a date/time expression character string;

a program for converting the relative date/time expression detected by said relative date/time detecting program into an absolute date/time expression;

a program for storing the converted absolute date/time character string;

a program for calculating difference date/time between present date/time and the stored absolute date/time;

a relative date/time converting program for converting said calculated difference date/time into relative date/time with respect to the present date/time;

a program for storing the relative date/time character string converted by said relative date/time converting program; and a program for displaying the convened character string of the relative date/time along with the character string of date/time contained in the previously read document data.

7. An electronic mail system comprising:

storing unit for storing thereinto document data of an electronic mail;

absolute date/time converting unit for converting a relative date/time character string of the stored document data into an absolute date/time character string in the case that a detection is made of a character string of relative date/time with respect to a character string of said document data;

relative date/time converting unit for converting the absolute date/time converted by said absolute date/time converting unit into relative date/time with respect to present date/time;

a display unit for displaying thereon both a character string of relative date/time before being converted and a character string of relative date/time after being converted; and a display processing unit for processing both the character string of the document data of the electronic mail and the character string of the relative date/time after being converted in such a manner that both said character strings are displayed on said display unit.

8. An electronic mail system, as claimed in claim 7 wherein:

said display processing unit executes the processing operation in such a manner that date related to a subject within the document data of the electronic mail is displayed on said display unit; and also, both a character string of relative date/time and a character string of relative date/time after being converted among character strings related to said subject are displayed on said display unit at the same time.

9. An electronic mail system as claimed in claim 7 wherein:

said character string of the relative date/time is equal to a date/time character string containing a year, a month, or a day.

10. An electronic mail system as claimed in claim 7 wherein:

said display processing unit has a character string editing function capable of displaying the character string of the relative date/time before being converted.

11. An electronic mail system as claimed in claim 10 wherein:

said display processing unit is executed in such a manner that the character string of the relative date/time after being converted is inserted after said character string of the relative date/time before being converted, and then, both the character strings are displayed.

* * * * *